United States Patent
Hofacker et al.

(10) Patent No.: US 7,420,077 B2
(45) Date of Patent: *Sep. 2, 2008

(54) PREPARATION OF ALIPHATIC OLIGOCARBONATE DIOLS

(75) Inventors: Steffen Hofacker, Odenthal (DE); Rolf Bachmann, Bergisch Gladbach (DE); Lothar Bäcker, Gossa (DE); Herbert Witossek, Leipzig (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/804,774

(22) Filed: May 21, 2007

(65) Prior Publication Data

US 2007/0219388 A1 Sep. 20, 2007

Related U.S. Application Data

(63) Continuation of application No. 10/941,659, filed on Sep. 15, 2004, now Pat. No. 7,238,825.

(30) Foreign Application Priority Data

Sep. 19, 2003 (DE) .............................. 103 43 471

(51) Int. Cl.
*C07C 69/96* (2006.01)
(52) U.S. Cl. ..................................... 558/276
(58) Field of Classification Search ................. 558/276
See application file for complete search history.

(56) References Cited

U.S. PATENT DOCUMENTS

| 6,818,784 B2 * | 11/2004 | Tillack et al. ................ 558/276 |
| 2003/0009047 A1 | 1/2003 | Tillack et al. ................ 558/265 |
| 2004/0143130 A1 | 7/2004 | Tillack et al. ................ 558/265 |

* cited by examiner

*Primary Examiner*—Elvis O Price
(74) *Attorney, Agent, or Firm*—Lyndanne M. Whalen; John E. Mrozinski, Jr.

(57) ABSTRACT

The present invention relates to an improved process for preparing aliphatic oligocarbonate diols by transesterifying dimethyl carbonate (DMC) with aliphatic diols.

3 Claims, No Drawings

PREPARATION OF ALIPHATIC OLIGOCARBONATE DIOLS

This application is a continuation of U.S. Ser. No. 10/941,659 filed on Sep. 15, 2004 now U.S Pat. No. 7,238,825.

FIELD OF THE INVENTION

The present invention relates to an improved process for preparing aliphatic oligocarbonate diols by transesterifying dimethyl carbonate (DMC) with aliphatic diols.

BACKGROUND OF THE INVENTION

Oligocarbonate diols can in principle be prepared from aliphatic polyols by reacting with phosgene, bischlorocarbonic esters, diaryl carbonates, cyclic carbonates or dialkyl carbonates. Such polyols are important precursors for producing plastics, paints and adhesives. They are reacted, for example, with isocyanates, epoxides, (cyclic) esters, acids or acid anhydrides.

DE-A 101 30 882 describes a two-stage process for preparing oligocarbonate diols, in which dimethyl carbonate (DMC) is first reacted with one or more aliphatic diols at a pressure of 1.5 to 100 bar and a temperature of 100° C. to 300° C., in the course of which the methanol formed in the reaction is removed from the reaction together with the DMC as a mixture. In the second step, the terminal hydroxyl groups are decapped by applying pressures of 1 to 1000 mbar and temperatures of 160° C. to 250° C. for several hours. The preferred reaction temperature for the decapping step is 200° C. and the pressure 100 to 200 mbar. Depending on the variant, the residence time of the reaction mixture at 200° C. is between 9 and 50 hours. The thus prepared oligocarbonate diols, at a number-average molecular weight $M_n$ of 2000 g/mol, have an OH number (OHN) of about 56 mg KOH/g. However, the actual OH functionality of the thus obtained products deviates from the theoretical value of 2.00. The reason for this is the formation of by-products having undesired end groups which lower the functionality, for example methyl ester, methyl ether, vinyl groups and others.

In many subsequent applications in which oligocarbonate diols are used, it is not only the OHN but also the actual OH functionality ($f_{OH}$) and in particular their consistency which are of particular significance. When the functionality deviates by more than 0.10 from the theoretical value of 2.00, this leads, as a consequence of the fractions of monofunctional oligocarbonates which function as chain terminators in polymerization reactions, to materials having distinctly worsened mechanical properties. It is therefore necessary to keep the actual OH functionality constant and close to the theoretical value of 2.00 for bifunctional oligocarbonate polyols.

SUMMARY OF THE INVENTION

Accordingly, the present invention obviates problems inherent in the art by providing an improved process for preparing oligocarbonate diols based on dimethyl carbonate, which leads to oligocarbonate diols having an OH functionality of $\geq 1.90$.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages and so forth in the specification are to be understood as being modified in all instances by the term "about."

It has been found that this can be achieved by continuously metering in DMC while simultaneously rapidly removing methanol from the reaction mixture and monitoring the reaction temperature during the decapping step.

The present invention provides a process for preparing oligocarbonate diols, in which, in a first step, dimethyl carbonate is reacted with a diol component, which may be an aliphatic diol or a mixture of aliphatic diols, or a mixture of aliphatic diols with lactones, with the addition of a transesterification catalyst at a pressure of 3 to 6 bar and at temperatures of 100 to 200° C., preferably 130 to 200° C., more preferably 140 to 200° C., by continuously introducing the DMC into the liquid phase of the reaction mixture and continuously removing from the reaction mixture by distillation the methanol which forms in the form of a gaseous methanol/dimethyl carbonate mixture, and, in a second step, on completion of the continuous metered addition of DMC, the temperature of the reaction mixture is first lowered to $\leq 190°$ C., preferably $\leq 180°$ C., and then the pressure is reduced slowly to atmospheric pressure, in the course of which further methanol/dimethyl carbonate mixture is distilled off in parallel, the pressure is further reduced stepwise once atmospheric pressure has been attained and, once a pressure of $\leq 100$ mbar has been attained, an inert gas stream is introduced into the reaction mixture.

The additional demand for DMC as a consequence of the distillation loss during the transesterification phase is 5 to 25%, preferably 5 to 20%, based on the amount required by the stoichiometry. The continuous addition of DMC and the immediate removal of the methanol from the reaction mixture at a transesterification temperature of 100 to 200° C. and a pressure between 3 and 6 bar ensures that the by-production of methyl ether end groups can be greatly reduced or prevented, which contributes to an increase in the OH functionality.

It is essential to the present invention that the DMC concentration in the reaction mixture is adjusted in such a way that, on the one hand, the by-production and the DMC excess required are minimized, and, on the other hand, the space-time yield is not impaired. This is preferably effected by keeping the pressure and the temperature constant, which (depending on the temperature) establishes a certain partial pressure of the dimethyl carbonate. The total pressure is preferably built up by introducing inert gas into the reactor. It is important that the DMC is added in such a way that the antogenous pressure of the DMC which is established does not exceed the predetermined total pressure. This ensures both that the by-production can be greatly reduced and the stoichiometric excess of DMC required can be minimized. Moreover, it becomes possible, as a consequence of continuous pressure control with constant transesterification temperature and controlled metering of DMC, to prepare an oligocarbonate diol having the desired molar mass or molar mass distribution without subsequent corrections of the stoichiometry (for example by adding further DMC or diol/diol mixture).

In the second inventive process step (decapping), on completion of the continuous metered addition of DMC, the temperature of the reaction mixture is first lowered to $\leq 190°$ C., preferably ≦180° C. Then, the pressure is slowly reduced to atmospheric pressure, in the course of which further methanol/DMC mixture is distilled off in parallel. On attainment of atmospheric pressure, the pressure is further reduced stepwise. When a pressure of ≦100 mbar is attained, an inert gas stream is introduced into the reaction mixture. In addition to the vacuum conditions, this has the effect of additionally entraining out methanol which has formed or DMC which is still present. This procedure promotes the formation of additional terminal hydroxyl groups, which contributes to an increase in the OH functionality and thus to improved product quality.

Inert gases used are those which do not intervene in the chemical process. Examples are nitrogen, argon, methane and natural gas. Preference is given to using nitrogen.

A significant feature of the decapping step is the temperature control of this phase. When the reaction temperature is raised to more than 190° C., there is an increased extent of by-production. This results substantially in terminal vinyl groups which lead to a drastic reduction in the OH functionality. It is therefore essential for the process according to the invention to set the temperature during the decapping phase to values of ≦190° C., preferably ≦180° C. This allows the formation of terminal vinyl groups to be prevented and thus the OH functionality to be increased.

After a halt time between 10 and 50 hours at a pressure of ≦100 mbar and a temperature of ≦190° C., preferably ≦180° C., the pressure is increased to atmospheric pressure by aerating with inert gas, preferably nitrogen. Subsequently, product properties such as OH number, viscosity, number-average molecular weight, OH functionality, etc. can be determined.

When the number-average molecular weight of the product is too high after the decapping phase, it is corrected by adding appropriate amounts of diol and/or diol mixture and reheating the reaction mixture to a temperature of 100 to 200° C. (similarly to the first process step) for one to five hours. There is not necessarily any need for a new decapping step after this correction, as long as all terminal OH groups were already in free form before the correction and no recapping of the terminal hydroxyl groups is built up by adding the diol component.

When the number-average molecular weight of the product after the decapping phase is too low, it is corrected by adding appropriate amounts of DMC and reheating the reaction mixture to a temperature of 100 to 200° C. (similarly to the first process step) for one to five hours. Since this procedure leads to a new build-up of capping, a new decapping step (similarly to the second process step) follows. However, the run times of the new decapping can be greatly reduced as a consequence of the comparatively small corrective amount of DMC added. However, it is essential here too to control the temperature in a similar manner to the above-described second process step.

The transesterification catalysts used in the process according to the present invention include titanium compounds (for example titanium tetraisopropoxide, titanium tetrabutoxide, etc.) or ytterbium compounds (for example ytterbium(III) heptadionate, ytterbium(III) acetylacetonate, etc.) or mixtures thereof. Preference is given to using titanium tetraisopropoxide or/and ytterbium(III) acetylacetonate. Particular preference is given to using titanium tetraisopropoxide.

The catalyst contents used are 0.01 to 1000 ppm, preferably 0.1 to 500 ppm, more preferably 1 to 200 ppm, based on the total amount of the oligocarbonate diol prepared. When titanium compounds are used as the catalyst and the predefined characteristic value is attained, they are deactivated by adding 1 to 2 times the weight of dibutyl phosphate based on the amount of the catalyst used. When ytterbium compounds are used as a catalyst, deactivation can be dispensed with. There is no need for any subsequent masking, precipitation or other removal or deactivation.

In the process according to the invention, a diol component is used which is an aliphatic diol or a mixture of aliphatic diols or a mixture of aliphatic diols with lactones.

It is possible to use aliphatic diols having 4 to 50 carbon atoms in the chain (branched or unbranched) which may also be interrupted by additional heteroatoms such as oxygen (O), sulphur (S) or nitrogen (N). Examples of suitable diols are 1,4-butanediol, 1,5-pentanediol, 1,6-hexanediol, 1,7-heptanediol, 1,12-dodecanediol, cyclohexanedimethanol, 3-methyl-1,5-pentanediol, 2,4-diethyl-1,5-pentanediol, bis(2-hydroxyethyl) ether, bis(6-hydroxyhexyl) ether, diols prepared by reducing dimerized unsaturated fatty acids ("dimer diols") or short-chain $C_2$, $C_3$ or $C_4$ polyether diols having a number-average molecular weight of <700 g/mol, and also mixtures thereof.

The addition products of the diols with lactones (ester diols), for example ε-caprolactone, valerolactone, etc., and also mixtures of the diols with lactones, may also be used, in which case there is no need for any initial transesterification of lactone and diol.

In the process according to the present invention, preference is given to using mixtures of 1,6-hexanediol and/or 1,5-pentanediol and/or 1,4-butanediol and ε-caprolactone and/or valerolactone, very particular preference to using mixtures of 1,6-hexanediol and ε-caprolactone.

The process according to the invention enables the preparation of oligocarbonate diols, oligocarbonate ester diols, oligocarbonate ether diols or mixtures thereof having number-average molecular weights of 500 to 5000 g/mol, preferably 500 to 2000 g/mol, an OH functionality of 1.85 to 2.00, preferably 1.90 to 2.00, and a residual content of methanol and DMC of in each case <0.10 mol %, and contents of terminal vinyl groups of <0.10 mol % and terminal methyl ether groups of <5.0 mol %. The mol % contents specified may be regarded as fractions of the compound described based on 1 mol of the theoretical target compound having two terminal hydroxyl groups.

The oligocarbonate diols prepared by the process according to the invention may be reacted with isocyanates, epoxides, (cyclic) esters, acids or acid anhydrides and thus used, for example, to prepare polymers, plastics, fibers, coatings, paints and adhesives. Equally, the oligocarbonate diols prepared in accordance with the invention may be used as constituents in polyurethane-based cast elastomer applications. They are also suitable as building blocks for moisture-hardening coatings, as binders or binder constituents and/or reactive diluents in solventborne or waterborne polyurethane coatings. They may also be used as building blocks for polyurethane prepolymers containing free NCO groups or in polyurethane dispersions or polyurethane solutions. The oligocarbonate diols prepared by the process according to the invention may also be used to produce thermoplastics such as aliphatic and/or aromatic polycarbonates, thermoplastic polyurethanes, etc.

EXAMPLES

The contents, listed in the examples, of compounds which, unlike the theoretical target compound, bear only one or no terminal hydroxyl groups were determined by $^1$H NMR analysis and the integral evaluation of the appropriate signals, as was the number-average molecular weight. The contents reported in mol % may be regarded as fractions of the compound described based on 1 mol of the theoretical target compound having two terminal hydroxyl groups. In the calculation of the OH functionality, the thus calculated values are interpreted as fractions of chain terminator molecules and taken into account appropriately.

Example 1

9,270 kg of 1,6-hexanediol and 8,950 kg of ε-caprolactone were initially charged at 70° C. in a stirred reactor having a column and total condenser. 1.5 kg of titanium tetraisopropoxide were added. Subsequently, the tank pressure was increased to 5.2 bar absolute by introducing nitrogen and kept constant, and the tank contents were heated to 200° C. Within 15 hours, 7,300 kg of dimethyl carbonate were metered in. At the same time, methanol which formed was distilled off with fractions of dimethyl carbonate. On completion of the addition, stirring was continued for 0.5 hours. Subsequently, the temperature was lowered to 180° C. and the reactor pressure reduced to atmospheric pressure within 3 hours.

The reactor pressure was then reduced to 90 mbar absolute within 12 hours. Once 90 mbar had been attained, 2 m³/h of nitrogen were introduced into the reaction mixture through a passage tube in order to remove residual methanol; the vacuum was also reduced to approx. 30 mbar. The mixture was stirred at a temperature of 180° C. and a pressure of <60 mbar for a total of 26 hours. OH number and viscosity were determined every 4 hours. The OH number of the product was corrected to the target value by adding a total of approx. 250 kg of 1,6-hexanediol. After the total decapping time had expired, 2.0 kg of dibutyl phosphate were stirred into the reaction mixture. Subsequently, the reactor was aerated and the reaction mixture cooled to 100° C. 20 000 kg of a clear, colorless resin which did not crystallize at room temperature, were obtained and had the following characteristic data:

| | |
|---|---|
| Number-average molecular weight: | 2,000 g/mol |
| OH number: | 57.8 mg KOH/g |
| Viscosity at 23° C.: | 15,800 mPas |
| Color number (APHA): | 60 hazen |
| OH functionality: | 1.94 |
| Content of terminal vinyl groups: | 0.0 mol % |
| Content of terminal methyl ether groups: | 1.7 mol % |

Comparative Example 1

A stirred tank was initially charged with 67.1 kg of ε-caprolactone, 69.5 kg of 1,6-hexanediol, 30.2 kg of dimethyl carbonate and 11 g of titanium tetraisopropoxide. After inertizing twice by applying vacuum and subsequently aerating with nitrogen, the mixture was heated to 140° C. The pressure was increased to 5.2 bar absolute using nitrogen and controlled to keep it constant with the aid of a pressure regulator. Under reflux conditions, the temperature was increased to 194° C. within 2 hours and kept under these conditions for 1 hour. Afterwards, the passage to the receiver was opened and a distillate consisting of methanol and DMC was distilled off. After distilling for two hours, a further 30.2 kg of DMC were metered in via an immersed tube at a temperature between 186 and 192° C. within 7 hours. At the same time, a distillate consisting of methanol and DMC was distilled off overhead into a receiver. On completion of the DMC addition, the temperature was increased initially to 196° C. for 1 hour and stirring was continued under these conditions for 4 hours. Subsequently, the temperature was increased to 200° C. within 1 hour and stirring was continued for 2 hours.

Within 1 h, the pressure was reduced to atmospheric pressure (1040 mbar), then to 100 mbar within 4 hours. The temperature was still left constant at 200° C. After 17 hours, a reaction product was obtained and had an OH number of 35.1 mg KOH/g and a viscosity of 50,000 mPas. After a total of 3 kg of 1,6-hexanediol had been added at 140° C. and atmospheric pressure, the temperature was increased to 200° C., the pressure reduced to 100 mbar and the reaction mixture thus decapped for a further 10 hours. After another 2 kg of 1,6-hexanediol had been added under the abovementioned conditions, decapping was effected at 200° C. and 100 mbar for a further 30 hours. After cooling to 80° C. and aerating with nitrogen, 14 g of dibutyl phosphate were stirred into the reaction mixture. A reaction product was obtained which had the following characteristic data:

| | |
|---|---|
| Number-average molecular weight: | 1,880 g/mol |
| OH number: | 60.3 mg KOH/g |
| Viscosity at 23° C.: | 13,000 mPas |
| Color number (APHA): | 8 hazen |
| OH functionality: | 1.88 |
| Content of terminal vinyl groups: | 4.0 mol % |
| Content of terminal methyl ether groups: | 1.9 mol % |

Comparative Example 2

A stirred tank was initially charged with 192.4 kg of ε-caprolactone, 199.2 kg of 1,6-hexanediol, 86.7 kg of dimethyl carbonate and 32 g of titanium tetraiso-propoxide. After inertizing twice by applying vacuum and subsequently aerating with nitrogen, the mixture was heated to 140° C. Subsequently, the pressure was increased to 5.2 bar absolute using nitrogen and controlled to keep it constant with the aid of a pressure regulator. Under reflux conditions, the temperature was increased to 194° C. within 2 hours and kept under these conditions for 1 hour. Afterwards, the passage to the receiver was opened and a distillate consisting of methanol and DMC was distilled off. After distilling for 2 hours, a further 86.7 kg of DMC were metered in via an immersed tube at a temperature of 194° C. within 3 hours. At the same time, a distillate containing methanol and DMC was distilled off overhead into a receiver. On completion of the addition, the temperature was increased initially to 196° C. and stirring was continued under these conditions for 3 hours. Subsequently, the temperature was increased to 200° C. within 0.5 hour and stirring was continued for 2 hours.

Within 1.5 hours, the pressure was reduced to atmospheric pressure (1040 mbar) and subsequently to 135 mbar in 4 hours, and to 100 mbar within a further 8 hours. The temperature was still left constant at 200° C. After a further 40 hours of decapping time at 100 mbar and 200° C., the mixture was cooled to 80° C. and aerated with nitrogen. Finally, 42 g of dibutyl phosphate were stirred into the reaction mixture. A reaction product was obtained which had the following characteristic data:

| | |
|---|---|
| Number-average molecular weight: | 1,920 g/mol |
| OH number: | 53.3 mg KOH/g |
| Viscosity at 23° C.: | 15,000 mPas |
| Color number (APHA): | 477 hazen |
| OH functionality: | 1.79 |
| Content of terminal vinyl groups: | 2.5 mol % |
| Content of terminal methyl ether groups: | 3.4 mol % |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing oligocarbonate diols, comprising: reacting dimethyl carbonate with a diol component in the presence of a titanium tetraisopropoxide transesterification catalyst at a pressure of 3 to 6 bar and at temperatures of 100 to 200° C., by continuously introducing the DMC into the liquid phase of the reaction mixture and continuously removing from the reaction mixture by distillation the methanol which forms as a gaseous methanol/dimethyl carbonate mixture, and, reducing the temperature of the reaction mixture on completion of the continuous metered addition of dimethyl carbonate, to ≦190° C., and reducing the pressure to atmospheric pressure, such that further methanol/dimethyl carbonate mixture is distilled off in parallel, further reducing the pressure after atmospheric pressure has been attained and, after a pressure of ≦100 mbar has been attained, introducing an inert gas stream into the reaction mixture, wherein the oligocarbonate diols have an OH-functionality of at least 1.9.

2. The process according to claim 1, wherein the diol component is a mixture of 1,6-hexanediol and ϵ-caprolactone.

3. The process according to claim 1, wherein the diol component comprises a mixture of one or more of 1,6-hexanediol, 1,5-pentanediol and 1,4-butanediol with one or more of ϵ-caprolactone and valerolactone.

* * * * *